J. F. CRAVEN.
WELL DRILL JAR.
APPLICATION FILED AUG. 28, 1913.
1,112,773.
Patented Oct. 6, 1914.
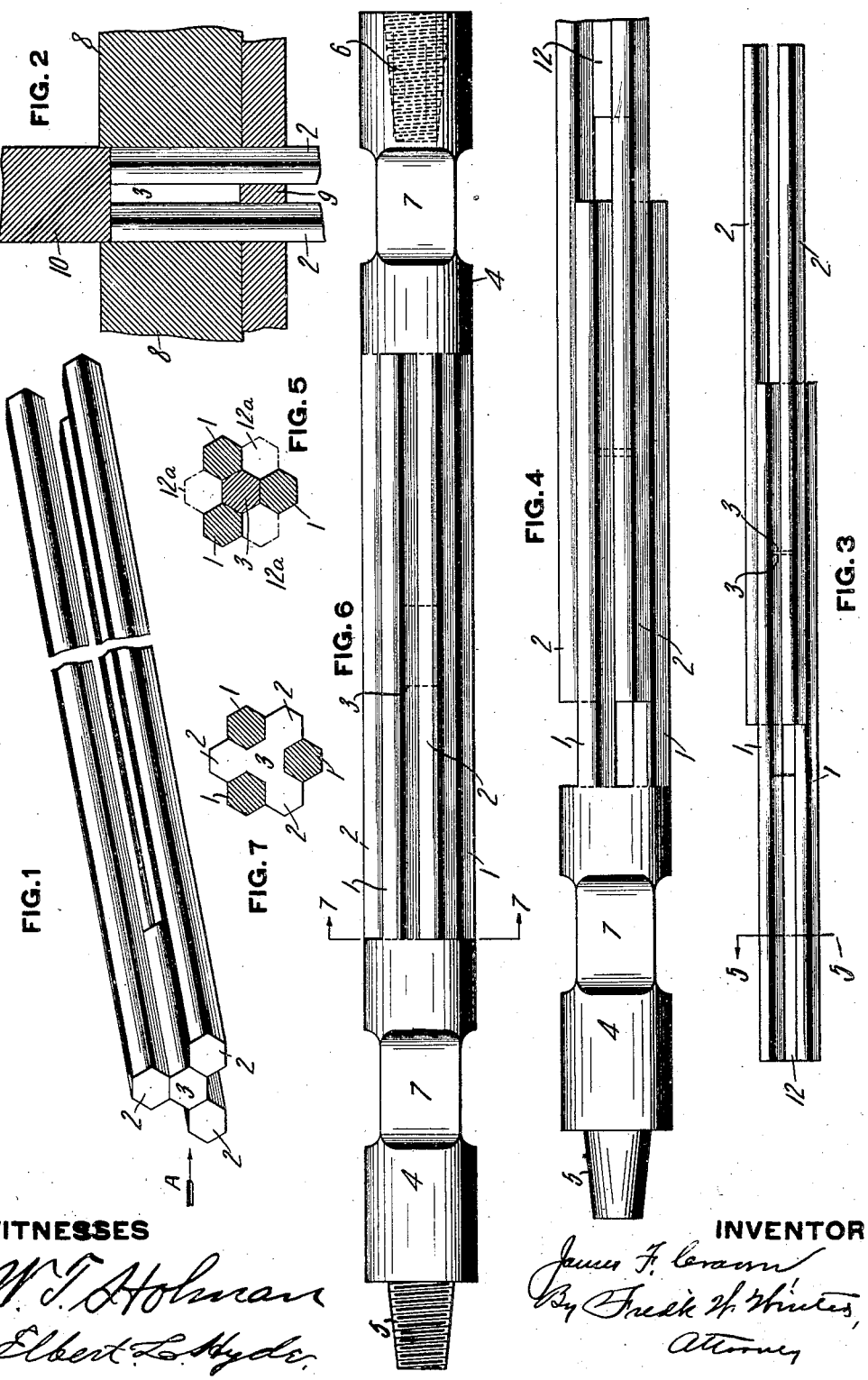
WITNESSES
INVENTOR

UNITED STATES PATENT OFFICE.

JAMES F. CRAVEN, OF CRAFTON, PENNSYLVANIA.

WELL-DRILL JAR.

1,112,773.  Specification of Letters Patent.  Patented Oct. 6, 1914.

Application filed August 28, 1913.   Serial No. 787,093.

*To all whom it may concern:*

Be it known that I, JAMES F. CRAVEN, a resident of Crafton, in the county of Allegheny and State of Pennsylvania, have invented a new and useful Improvement in Well-Drill Jars, of which the following is a specification.

This invention relates to drill jars and the method of making the same.

The object of the invention is to provide a drill jar which is stronger, more durable, and not so liable to break, one which can be more easily and cheaply manufactured, and one which is more accurately and symmetrically shaped than drill jars as heretofore constructed, and therefore one in which the two links guide each other in such manner as to prevent one link tilting or inclining relative to the other, thereby insuring the drilling of a straight hole; and particularly a drill jar which can be manufactured by machine operations and from accurately drawn or rolled stock.

Drill jars as at present constructed are formed by forging out of a billet or the like the anvil or striking members of the two links, each with two rein members projecting endwise therefrom and in substantial parallelism. This operation is performed by hand and the rein members are only as accurate and uniform in cross section from end to end as it is possible to produce by hand forging. Two such partially formed members are assembled together and the shanks or heads, which have been separately forged and each formed with a pair of short projections or prongs, are then secured to the link members by welding the projections or prongs of the shanks or heads to the ends of the rein members of the links. Such welding operation is performed by hand, and usually in the form of a bevel lap weld. It is practically impossible to form both welds simultaneously, and consequently it is the usual practice to weld together the members of the two reins separately. This inevitably makes one rein slightly longer than the other, due either to improper positioning of the parts before welding, but more generally due to the fact that the rein member first welded is quite cold when the other is welded, thereby resulting in unequal shrinkage. For this reason one rein member is usually under a greater tension or stress than the other and the load consequently falls more upon one than the other.

Practice has shown that such drill jars invariably fail by breaking at or close to the welded joint. Furthermore, such hand-forged and welded jars cannot have the reins of uniform cross section from end to end or very closely fitting together. Consequently they do not guide each other accurately and the lower link is liable to tilt or tip with reference to the upper link, which results in the drilling of a crooked hole. The breakage of a drill jar results not merely in the repairment or replacement of the broken member, but has more serious consequences in that the drilling tool is left at the bottom of the hole, which always leads to very considerable expense in fishing for it and frequently necessitates an abandonment of the well.

By my invention the above objections to drill jars and present methods of manufacturing the same are overcome.

Generally speaking the invention consists in a drill jar comprising links, each formed from a plurality (two or more) of merchant steel bars, either rolled or drawn, with the anvil and shanks formed from short sections of similar bar placed between the ends of the links and secured therein by a machine welding operation, thereby not only greatly reducing the cost of manufacture but producing a drill jar whose reins are continuous from end to end and have no welded joint whatsoever therein, thereby leaving the metal of maximum strength; a jar in which the reins of each link are necessarily of exactly the same length and are under exactly the same strains and conditions, and furthermore, a jar whose reins are of uniform cross section from end to end, so that the two reins accurately and closely fit each other and each is accurately and closely guided by the other.

In the accompanying drawing, Figure 1 is a perspective view illustrating the members forming the reins and anvil of one form of link to which my invention is adapted; Fig. 2 is a diagrammatic section illustrating the dies of the welding machine for welding the anvil member and ends of the reins together; Fig. 3 illustrates two of such partially formed link members assembled preparatory to welding the shanks thereto, as they appear viewed in the direction of the arrow A, Fig. 1; Fig. 4 is a similar view on a larger scale, showing a completely formed shank at one end and the unwelded assembled members at the opposite end; Fig. 5 is a cross section on the line 5—5, Fig. 3, and in dotted lines showing certain extra filling blocks; Fig. 6 is a side elevation corresponding to Fig. 4, of the completed drill jar, and Fig. 7 is a cross section on the line 7—7 Fig. 6, looking in the direction of the arrows.

In the drawings the drill jar is shown with links having three reins each of hexagonal cross section, and while this is a desirable form of such article it will be understood that this is merely illustrative, as the links may be provided with two, three or four reins, and the reins may be of any desired cross sectional shape. As specifically illustrated in the drawings each link is composed of three reins, those on one link being numbered 1, and those on the other link being numbered 2, with an anvil member 3 welded between said reins at one end thereof, and a shank or head 4 welded to the other end thereof. The head of one of the links is formed as a tang 5 for attachment to the operating rope, cable or like member, and that on the other link is a socket 6 for having secured to it the drilling tool, both heads being provided with wrench receiving portions 7.

In the fabrication of the drill jar the following method is followed: The reins are formed from suitable lengths of standard rolled or drawn bars, of hexagonal or other suitable cross sectional shape, such as can be readily purchased in the open market and which are cheap and at the same time of accurate cross sectional shape. These bars are cut to the proper length to form the links, which length should be equal to the length of the reins in the finished link, plus the overall length of its shank or head, or a little more, as will hereinafter appear. A short piece of the same bar is cut off to form the anvil member 3, and when the bars are of hexagonal cross section and the reins three in number these parts will readily assemble together, as shown in Fig. 1. The four assembled members are then suitably welded together. This can be done in various ways, such for instance, as by an electric welding process. Preferably, however, the assembled bars, suitably clamped or bound together, are heated to a welding temperature and are then placed between the clamping dies 8 of a forging press, with the anvil 3 resting on a bed block 9. The dies 8 are shaped to conform to the assembled bars, and come in laterally and forcibly squeeze the bars together, thereby producing a weld along the contacting side faces of the rein bars and the anvil or filling bar. The forging press also preferably is provided with an upsetting plunger 10, which when the bars are clamped between the clamping dies, strikes a blow on the ends of the four assembled bars, thereby compressing and upsetting the same and completely filling the side clamping dies. Consequently the welded together portions form practically an integral structure, as shown in Fig. 7. Also, the anvil member 3 is expanded slightly normally to its axis, and becomes sufficiently larger in cross section than the rein bars to afford proper clearance between the two links of the jar when interlocked, to enable them to slide easily and without substantial friction longitudinally with reference to each other. Two partially formed links constructed as just described are assembled in the relation shown in Fig. 3, that is, with the reins interlocked and the anvils or striking members 3 opposing or abutting each other. A short hexagonal bar 12 is then placed between the free ends of the reins of one of the link members. Bar 12 is chosen of a length greater than the length of the shank or head of the link to be formed. The free ends of the reins and the bar 12 are bound tightly together and are heated in a furnace to a welding temperature. The links are then withdrawn from the furnace, and the heated end portions of the reins are placed between the clamping dies of a second forging or upsetting press of substantially the same construction as that first described and shown in Fig. 2. The dies of this press are similar to the dies 8, but are formed of the proper shape to give the shank or head the desired configuration, as will be readily understood. The side clamping dies are moved inwardly to compress the end portions of the reins and the filling block 12 lying therebetween, while the upsetting plunger, corresponding to head 10, moves in endwise and upsets the metal, thereby not only securely welding all four parts together, but also causing lateral flow of the metal sufficient to fill up the side spaces between adjacent reins and all cavities of the side clamping dies, and thereby forming a solid integral shank or head as shown in Fig. 4. One stroke of the plunger of this press is sufficient to completely weld the reins and filling block and entirely shape the shank or head. Instead of providing an extra length of metal in the end portions of the reins and in the filling block 12, which is upset and caused to flow laterally to fill up the spaces between the adjacent reins, extra filling blocks 12ª of which there are three in the form now being described, may be inserted at the sides between the adjacent reins as shown in dotted lines Fig. 5, making four filling blocks in all. These filling blocks will be welded to the reins and to the central filling block by the same operations of the second forging press just described. After one shank or head is formed in the manner described, a second filling block 12 is placed between the free end portions of the reins of the other link member, as shown at the right in Fig. 4. The reins and this filling block are bound together, heated to a welding temperature and then forged to form the second shank or head in the same manner described for forming the first shank. The pin or tang 5 and socket 6 may of course be formed by the usual turning, threading and tapping operations.

My improved method materially decreases the labor cost in manufacturing drill jars. Heretofore, this has required a skilled operator earning nine or ten dollars a day and two or three helpers each earning from three to five dollars a day, and who are only able to make about one set of jars per day. According to my method the reins and filling blocks can be cut from standard bars rapidly and with cheap labor. No special requirements or ability are necessary to assemble the parts, heat them and insert them in the forging press, which can be depended upon to perfect the weld if the parts are merely placed in the proper positions therein. The jar when formed has symmetrical reins of full strength from end to end and is not inherently weak because of welds along the length thereof. Moreover, the contacting surfaces between the filling blocks 3 and 12 and the side faces of the reins are of considerably greater area than the contacting area between the two parts of the reins when welded with a bevel lap weld as heretofore. Consequently, the entire structure is much stronger and each link is practically an integral structure. The reins are of accurate shape and cross section from end to end and fit each other closely so that they are positively guided during relative longitudinal movement. Their close fit also prevents access of sludge and grit to the open space between the anvils or striking members, so that there is considerably less wear upon the parts than in prior drill jars. When the jar is formed of three reins, as shown, there is also less liability of loss of one link and the drilling tools, since if one rein breaks two reins remain interlocked with the reins of the other link, and these are sufficient to enable the drilling tool to be withdrawn from the hole.

What I claim is:

1. A drill jar link comprising reins having a filling block welded between the side faces of the reins at one end thereof to form the anvil, and a second filling block welded between the side faces of the reins at their other ends, the second filling block and reins being forged to form the shank or head.

2. A drill jar comprising reins of uniform cross section from end to end and having a filling block welded between the side faces of the reins at one end thereof to form the anvil, and a second filling block welded between the side faces of the reins at their other ends, the second filling block and the adjoining end portions of the reins being forged to form the shank or head.

3. A drill jar link comprising hexagonal rein bars of uniform cross section from end to end and having a hexagonal filling block welded between the inner side faces of the reins at one end to form the anvil, and a second hexagonal filling block welded between the inner faces of the rein bars at their other ends, the second filling block and the adjoining end portions of the rein bars being forged to form the shank or head.

4. A drill jar comprising two interlocked links, each link being formed of reins having filling blocks welded between the inner side faces thereof to form the anvil and shank.

5. A drill jar comprising two interlocked links, each link formed of side rein bars of uniform cross section from end to end and having filling blocks welded between the side faces of the end portions of the links to form the anvil and shank.

6. A drill jar comprising two interlocked links, each link being formed of hexagonal rein bars of uniform cross section from end to end and having hexagonal filling blocks welded between the end portions of the rein bars to form the anvil and shank.

7. The method of making drill jar links, consisting in welding a filling block between the side faces of the end portions of at least two rein bars, welding a similar block between the side faces of the other end portions of said bars, and forging said second filling block and the adjoining end portions of the rein bars to form the shank or head.

8. The method of making drill jar links, consisting in securing a filling block between the inner side faces of the end portions of two or more rein bars spaced symmetrically around said filling block, welding a similar block between the inner side faces of the other end portions of said rein bars, and forging the second filling block and the adjoining end portions of the rein bars to form the shank or head.

9. The method of making drill jars, consisting in welding a filling block between the inner side faces of the end portions of at least two rein bars, interlocking two of said partially formed links, welding similar filling blocks between the inner side faces of the free end portions of said links, and shaping the material at the end of each of said links by the same operation that produced the weld to form a shank or head therefor.

10. The method of making drill jars, consisting in interlocking two partially formed links having reins of uniform cross section and length, welding a filling block between the inner side faces of the free end portions of each of said links, and forging said filling block and the adjacent end portions of the reins to form the shank or head.

11. The method of making drill jars, consisting in interlocking two partially formed links having reins of uniform cross section and length, welding a filling block between the inner side faces of the free end portions of said links, and forging said filling blocks and the adjoining end portions of the side reins to form the shanks or heads.

12. The method of making drill jars, consisting in welding a filling block between the inner side faces of the end portions of two or more rein bars, interlocking two of said partially formed links, welding filling blocks between the inner side faces of the free end portions of said bars, and forging and upsetting said second named filling blocks and the adjacent end portions of the rein bars to form the shanks or heads and to produce clearance between the rein bars of the two links.

13. The method of making drill jars, consisting in welding a hexagonal filling block between the inner side faces of the end portions of three hexagonal side rein bars spaced uniformly around said filling block, interlocking two of said partially formed links, welding hexagonal filling blocks between the inner side faces of the free ends of said side rein bars, and forming said second named filling blocks and the adjacent end portions of the rein bars to form the shanks or heads.

14. The method of making drill jars, consisting in welding a filling block between the side faces of the rein bars to form the anvil end of the link, assembling two such partially formed links by interlocking the same, and welding filling blocks to the free ends of the rein bars to form the shanks or heads, the rein bars at one end being welded to said filling blocks at a single operation.

In testimony whereof, I have hereunto set my hand.

JAMES F. CRAVEN.

Witnesses:
 ELBERT L. HYDE,
 SUE B. FRITZ.